United States Patent [19]

Stoll

[11] Patent Number: 5,038,924
[45] Date of Patent: Aug. 13, 1991

[54] IMPACT SADDLE FOR CONVEYOR BELTS

[75] Inventor: Donald L. Stoll, Huntington, W. Va.

[73] Assignee: Richwood Industries, Inc., Huntington, W. Va.

[21] Appl. No.: 594,758

[22] Filed: Oct. 9, 1990

[51] Int. Cl.⁵ .............................................. B65G 15/08
[52] U.S. Cl. .................................... 198/823; 198/841
[58] Field of Search ............ 198/841, 823, 818, 860.1

[56] References Cited

U.S. PATENT DOCUMENTS

| | | | |
|---|---|---|---|
| 2,702,115 | 2/1955 | Cunningham | 198/823 X |
| 2,921,668 | 1/1960 | Risse | 198/837 X |
| 3,360,105 | 12/1967 | Pelzer | 198/837 X |
| 4,215,776 | 8/1980 | Esler | 198/823 |
| 4,280,619 | 7/1981 | Ward et al. | 198/823 |
| 4,696,390 | 9/1987 | Curtis | 198/823 |
| 4,793,470 | 12/1988 | Anderson | 198/823 |

FOREIGN PATENT DOCUMENTS 2416775 10/1975 Fed. Rep. of Germany .
458676 5/1935 United Kingdom .
2188018 9/1987 United Kingdom ................ 198/823
2204848 11/1988 United Kingdom ................ 198/841

Primary Examiner—Robert P. Olszewski
Assistant Examiner—Cheryl L. Gastineau
Attorney, Agent, or Firm—Biebel & French

[57] ABSTRACT

An improved impact saddle is provided for use in place of a conventional impact roller assembly, for supporting a bulk material conveyor at an impact zone. The assembly includes a support frame which is adapted to be positioned in transverse relation to the length of the belt. The support frame forms a pair of side-by-side T-shaped supports which extend in parallel relation transversely of the belt. A plurality of polymeric low friction segments, such as high molecular weight polyethylene, are formed with lower T-shaped slots which are adapted to receive the T-shaped supports for threading onto the support frame. The segments have upper surfaces which collectively form a support for a section of the conveyor belt in the impact zone.

8 Claims, 3 Drawing Sheets

IMPACT SADDLE FOR CONVEYOR BELTS

BACKGROUND OF THE INVENTION

The invention relates to belt-type conveyor systems, and more particularly to the conveyor systems which carry bulk materials, such as for carrying crushed stone, gravel, coal and the like. Commonly, the upper runs of the conveyor belts are supported on conveyor belt idlers, which from a particularly troughing angle with the upper run of the belt. Such conveyor systems have a loading or impact zone, where the material to be carried by the belt is loaded onto the belt surface. The force of the loading of the material, at the loading zone, applies a particularly high stress to the belt and to belt-supporting idlers.

Commonly, special idler rollers are used in the loading zone, known as impact rollers, which are specially constructed to absorb the loading impact forces. An impact idler assembly is a heavy-duty version of the normal conveyor belt idler, in which the rollers are more resistant to impact loading. The rollers, themselves, are usually three in number, that is, two side rollers and a bottom roller, mounted for rotation on a common support frame, and the rollers may be formed with a cushioning surface, such as in the form of a stack of discs, to resist impact. A good example of an impact idler consists of the stacked rubber disc impact idler, types HG and HS, of Continental Conveyor & Equipment Company, Inc., Windfield, Ala. 35594. Thus the conventional idler roller assembly consists of a series of transversely oriented individual rollers mounted or supported in end-to-end relation on a common transverse support or saddle frame, and mounted so that the running surfaces of the rollers define the desired troughing angle.

Impact rollers are, themselves, subject to premature and often unpredictable failures. For example, the idler bearings may fail due to the high loading or due to spill-overs or contamination from the material being carried, or from dust. Also, the impact roller surface may become damaged or out of round. When a bearing or impact idler fails, the impact roller can jam, causing damage to the belt or requiring shut down of the conveyor system.

A number of solutions have been proposed, most of which require the reconstruction of the impact zone by the substitution of a slider bed in the zone. A typical slider bed, also known as a belt cradle assembly, is shown in Andersson, U.S. Pat. No. 4,793,470 issued Dec. 27, 1988. The series of impact rollers is replaced by a single cradle at the impact area, the cradle is formed with a series of longitudinally extending, transversely spaced slats or bars formed of high molecular weight polymer material, cushioned by a rubber underlayer. Such slider beds are particularly effective in providing a long wearing belt support, at the impact zone, and in eliminating the problems of failures of impact idlers.

The principal disadvantage of the impact zone slider beds, of the general kind shown in Andersson, resides in the relatively high initial cost of the conversion to such a slider bed, usually requiring a shut down and redesign of the conveyor system, to accept a slider bed at the impact zone. Also, in the event it should become necessary to repair or replace one of the longitudinal bars, this usually requires a shut down of the conveyor since the bars are usually only accessible from a position beneath the upper run of the belt.

A need exists for an improved impact idler, which can be substituted directly for an existing idler, and provide the advantages which are afforded by costly conversion to a bar-type impact bed or slide assembly.

SUMMARY OF THE INVENTION

This invention is directed to an impact saddle for a belt-type bulk material conveying system is a direct substitute for an impact idler assembly, and more particularly to an impact saddle which has no moving parts. The impact saddle of this invention is designed as a direct replacement for interchange with a standard impact idler assembly presently in use, requiring no substantial modification of the conveyor structure, other than the removal of the existing impact idler assembly, including the idler roller support frame, and the substitution of the support frame and impact saddle of this invention.

The invention provides a support frame which defines a pair of generally T-shaped parallel supports, extending in transverse relation to the direction of belt movement. The T-shaped supports form an upwardly facing concavity or curve which approximates the troughing angle of the idlers. These supports receive thereon a low friction belt support in the preferable form of a series of replaceable low-friction polymeric segments, positioned one next to the other transversely of the width of the supporting frame. The upper surfaces of the support, as defined by the segments, which may be planar or flat, provide a support for the belt. Preferably the segments are formed as blocks of ultra-high molecular weight polyethylene, with elastomeric or rubber impact cushions therein or a alternatively, may be formed of a self-lubricating urethane.

The individual segments, mounted on the supporting frame, are replaceable after installation without having to remove the frame. They are assembled by threading or sliding on the frame and replaced simply by driving new segments on from one side and allowing the old segments to come off the opposite side.

Impact saddles, in accordance with this invention, replace existing impact idler assemblies and can be spaced apart along the impact zone as is common with impact idlers, or can be spaced in immediate side-by-side relation to provide a continuous support region for the belt, such as for use in severe or heavy impact situations. The segments themselves are formed with a double T-shaped slot design for mounting on T-shaped support members of the saddle frame. This design holds the individual segments in place without the need for clips or bolts. The segments, which may be formed of ultra-high molecular weight polyethylene, have upper surfaces which, collectively, define a transversely extending belt-supporting impact surface.

While the T-shaped support members of the saddle frame may be smoothly curved to approximate the desired troughing angle, the segments may be formed witn straight lines and with flat upper belt-supporting surfaces. The transversely abutting ends may be cut at a slight angle so as to permit the individual segments to come flat against each other, with the upper surfaces approximating a curve.

Preferably, a pad of impact absorbing rubber material is positioned between the segments and the support, for distributing the impact load from any one segment to the supporting frame, thereby preventing cracking or damage to the individual segments. The impact rubber may be in the form of a continuous transversely oriented pad or strip, one for each of the T-shaped slots, and positioned between the slot and the corresponding support member of the saddle frame. A tough, resilient low-friction bed is thus provided, shaped to the natural contour of the loaded belt in accordance with the desired troughing angle. The individual segments, supported on the frame, may be replaced as required without the necessity for removing the support frame.

It is accordingly an important object of this invention to provide an impact assembly, for belt-type material conveying systems, which may be used as a direct substitution or replacement for existing impact idler support frames and the supporting idlers on the frames, thereby permitting a rapid conversion to a polymeric low-friction, slider support without undue conversion costs or long shutdowns or delays with respect to the operation of the conveyor system.

Another object of the invention is the provision of an impact saddle supporting a plurality of individual transversely spaced polymeric low-friction segments on a T-shaped support, such as with T-slots formed in the lower surface of the segments, thereby premittimg the segments to be captured in place without the need for accessory clips and retainers, while providing for ease of change or replacement of the segments, with the supporting frame in place.

These and other objects and advantages of the invention will be apparent from the following description, the accompanying drawings and the appended claims.

BRIEF DESCRIPTION OF ACCOMPANYING DRAWINGS

DESCRIPTION OF PREFERRED EMBODIMENT

Figure 1:
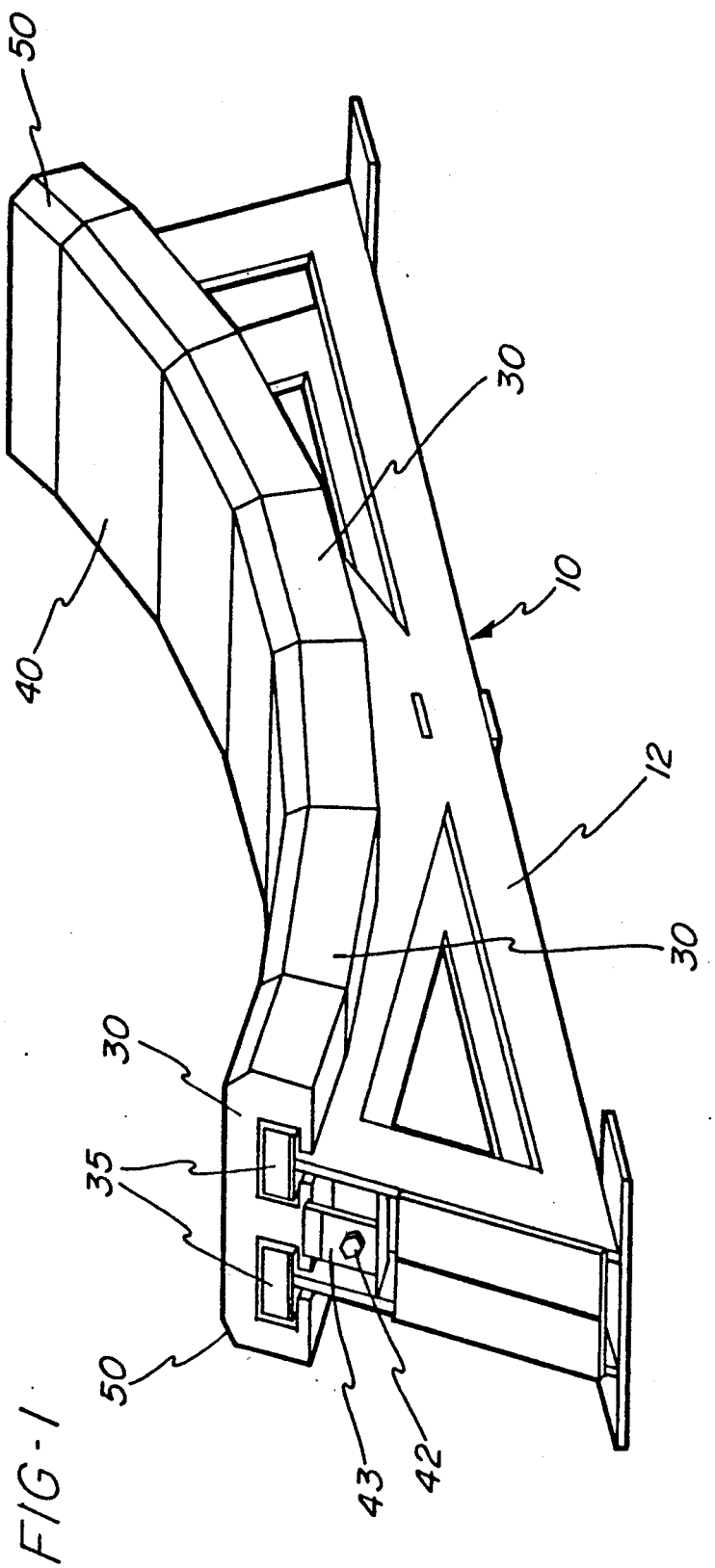
FIG. 1 is a perspective view of an impact saddle assembly in made accordance with this invention.

Referring to the figures of the drawing, which illustrate a preferred embodiment of the invention, an improved impact saddle for use with a bulk material conveyor is illustrated generally at 10 in FIG. 1. The saddle 10 has a non-moving sliding impact surface and is used in place of a conventional impact roller assembly, in an impact zone.

Figure 4:
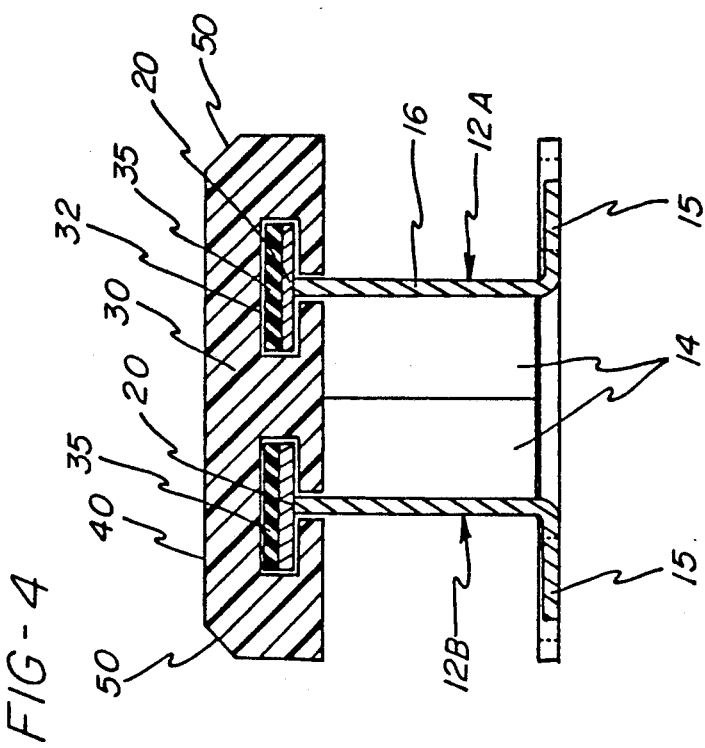
FIG. 4 is an enlarged cross-sectional view through the assembly, and through one of the impact segments.

The saddle 10 includes a support frame 12 formed in two identical halves, namely a right-hand support frame 12a and a left-hand support frame 12b, as best shown in the sectional view of FIG. 4. The frame sections 12a and 12b are mounted with end flanges 14 in abutting and welded relation, and are formed with outwardly extending feet 15 by which a frame may be secured or attached to a suitable support.

The frames 12a and 12b have vertically extending support portions 16 which terminate in a pair of parallel, side-by-side T-shaped support members 20.

The support frame 12 is adapted to be positioned in transverse relation to the length of a bulk-type conveyor belt (not shown) and is formed with an overall width in the direction of belt movement which is approximately the same as that occupied by a conventional impact roller-type idler. The T-shaped support members 20 are curved transversely of the width of the frame in an approximate duplication of the desired troughing angle of the belt.

The members 20 support low friction belt-engaging means in the form of a plurality of individual, identical impact segments 30. For this purpose, the segments 30, as shown in the sectional view of FIG. 4, are provided with a pair of T-shaped slots 32 in their lower surface which are proportioned to recieve one of the T-shaped support members 20 therein. The individual segments 30 are isolated from the T-shaped support members 20 by transversely extending blocks or pads 35 of rubber material. In a typical installation, these pads 35 may be about 1.0 inch thick, and as wide as the members 20, and may extend continuously along the upper length of the upper surface of the support members 20 and suitable bonded thereto. They may be made of a rubber material having a durometer of approximately 40.

The individual segments 30 are preferably formed of ultra-high weight molecular material, such as UHMW polyethylene, although other material materials may be used, such as a self-lubricating urethane. The cushions defined by the pads 35 permit the individual segments 30 to move on the support frame 12 independently of an adjacent such segment.

Figure 2:
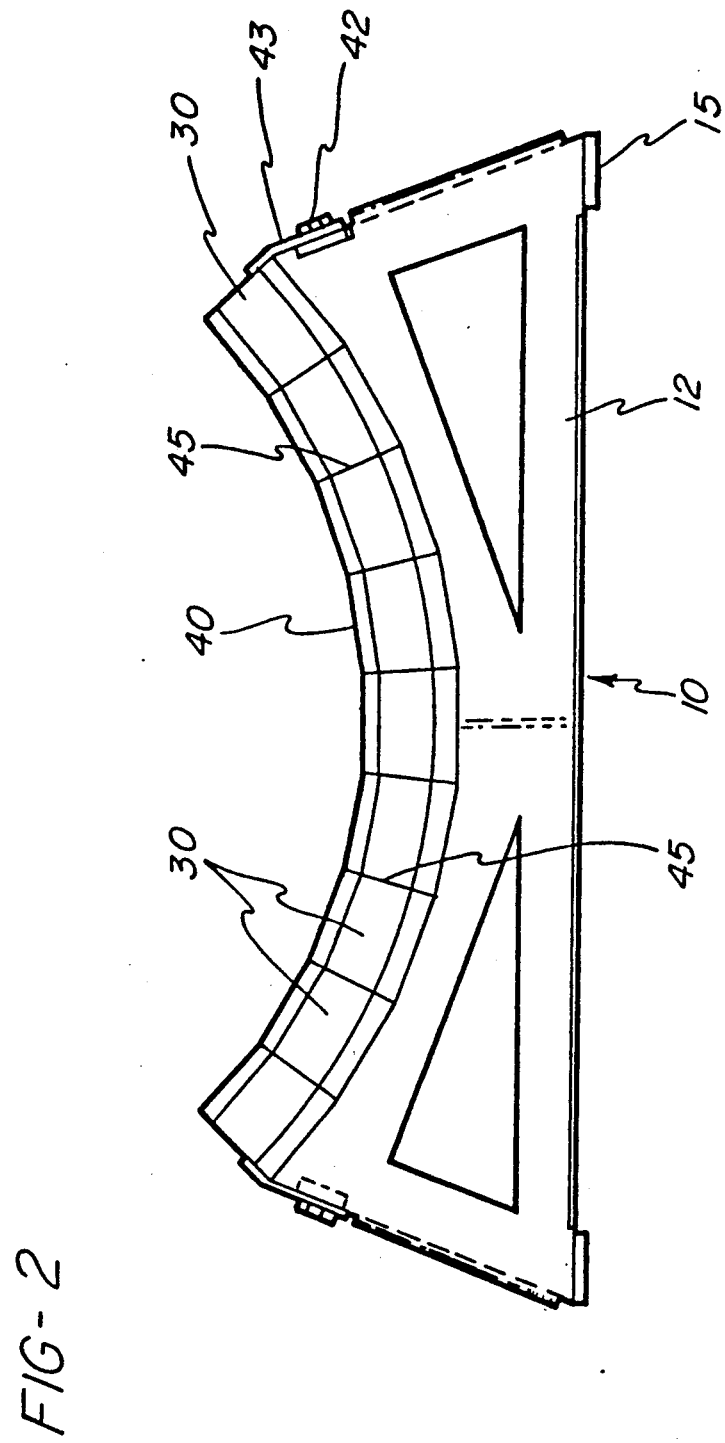
FIG. 2 is a side elevation, looking in the direction of belt movement, of the saddle assembly of FIG. 1.
Figure 3:
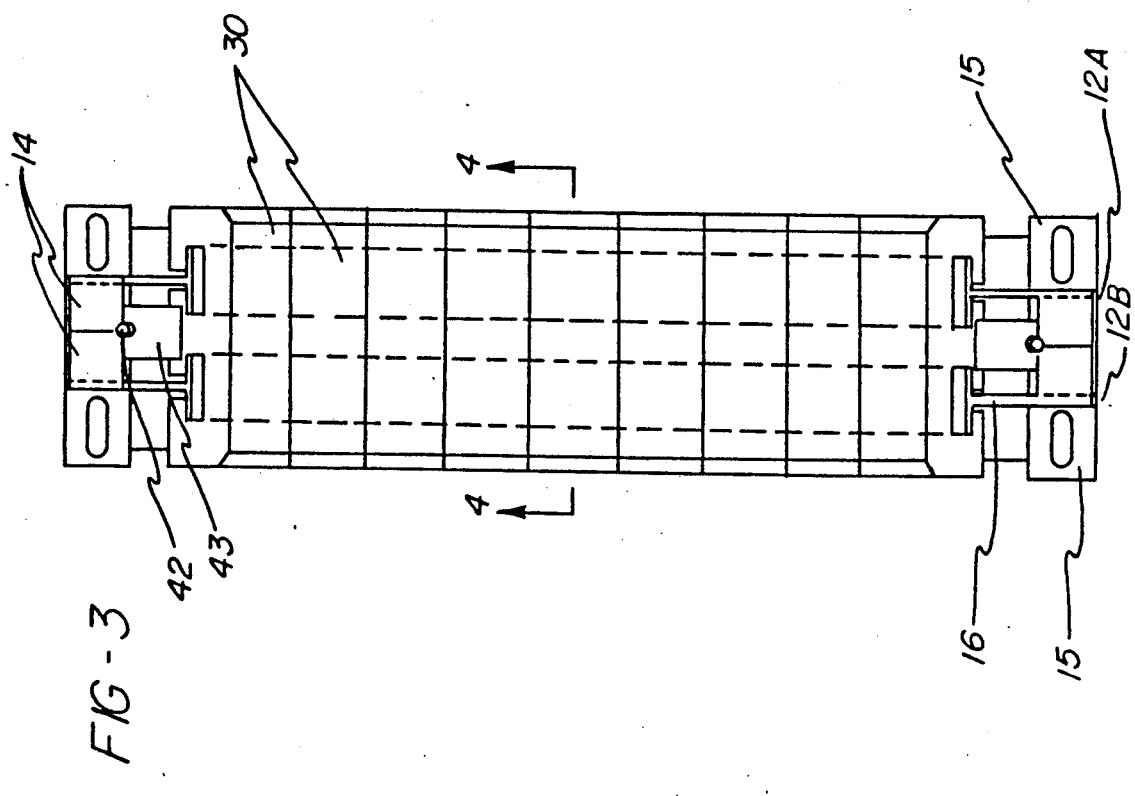
FIG. 3 is a top view of the saddle assembly.

As previously noted, the segments 30 may be configured in an identical manner and are stacked or threaded end-to-end on the support 12, such as illustrated in FIGS. 1, 2 and 3. The segments 30 have generally planar or flat upper belt-supporting surfaces 40, although it is within the scope of this invention to employ curved surfaces.

A plurality of the individual segments 30 are mounted in abutting end-to-end relation transversely of the support frames 12, as illustrated in FIGS. 1 and 3, and are retained in position by a bolt 42 and clip 43 at the opposite ends. The abutting end surfaces 45, FIG. 2, may be formed with a slight taper so as to facilitate the flat end-to-end abutment of the individual segments, as shown. The top surfaces 40 may be provided with end chamfers or tapers 50, along the transverse opposite edges, to provide on-running and off-running surfaces for the overlying belt.

Preferably, the flat upper surfaces 40 of the segments 30 present a transversely continuous or relatively unbroken support surface for the belt, as illustrated in FIG. 1 in that there is no appreciable gap or space between the individual impact segments 30. However, if desired, grooves extending in the direction of belt movement may be formed between individual segments 30 or formed in the individual planar surfaces 40 in appropriate circumstances.

The entire saddle assembly 10 is designed to be positioned beneath the upper run of the belt of a bulk-type conveyor, in the exact space occupied by an existing impact roller saddle assembly. A plurality of individual impact saddles 10, in accordance with this invention, may be placed in side-by-side relation and distributed along an impact zone, as required, for proper support of the belt. The impact saddles may thus be spaced from each other or, where desired they may be placed in immediate adjacent relation to form, in effect, a relatively continuous impact support surface.

Once the support saddle according to this invention is installed, the individual segments 30 are replaceable without moving the idler frame 12 or without the necessity of moving the belt. The retainer, in the form of the blots 42 and clips 43, may be removed, and the segments may be driven off simply by driving new segments from one side of the frame 12 onto the T-shaped supports 20, and the old or worn segments 30 will come off of the opposite side of the saddle 10.

The double T-slot design is particularly advantageous as it holds the individual segments 30 in place, on the saddle, without the need of additional external blots or clips. In other words, the segments 30 are, in effect, self-holding since they are threaded onto the saddle frame 12. Also, while the invention has been described as employing a plurality of individual segments 38, it is within the scope of the invention to employ a single or one piece formed or shaped impact member in place of the segments.

It will be understood that the individual support frames will be tailored in accordance with the conveyor belt, and the troughing angle, such as typically a 25°, 35° or 45° troughing angle. Further, while the segments 30 may be identical, the angles of the abutting surfaces 45 may be adjusted or varied, as required, so that the segments may come into flat abutment with each other, with the upper surfaces 40 approximating a curve. For example, for segment 30 designed for a 45° troughing angle, the end surfaces 45 may be formed at a 4½° angle to the surface 40 so that the segment is somewhat narrower at its top than at its bottom. Thus the individual segments may be 12 inches wide, 4 inches deep, with a length transverse to the belt which may vary in accordance with belt width, so that a whole number of segments may be employed, such as nine segments typically illustrated in FIGS. 2 and 3.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An improved impact saddle for use with a bulk material conveyor belt and having a non-moving impact sliding surface which may be used in place of a conventional impact roller assembly in an impact zone, comprising:

a support frame adapted to be positioned in transverse relation to the length of the conveyor belt and having a width in the direction of belt movement which is approximately the same as that occupied by a conventional impact roller-type idler, said frame having means defining an upper curved impact segment supporting member, and a plurality of polymeric low friction segments threaded on said member in a direction transverse to the length of the conveyor belt, said segments collectively defining an upper transversely extending belt-supporting surface.

2. The saddle of claim 1 in which said segments are formed of high density material.

3. The saddle of claim 1 in which said segments are identical to each other.

4. The saddle of claim 1 in which said segment supporting member comprises a pair of side-by-side T-shaped supports which extend in parallel relation transversely of the length width of the belt, and in which said segments are formed with T-shaped slots adapted to receive said supports therein and providing for the threading of said segments onto said supports.

5. The saddle of claim 3 in which said segments are threaded in abutting relation to each other.

6. The saddle of claim 4 further comprising a pad of rubber material in said slots between said segments and said T-shaped supports providing an impact cushion for said segments.

7. The saddle of claim 2 in which said segments are formed of ultra-high molecular weight polyethylene.

8. An improved impact saddle for use with a bulk material conveyor belt, and having a transversely extending non-moving impact sliding surface for supporting a transverse portion of such conveyor belt in an impact zone, comprising:

a support frame adapted to be positioned in transverse relation to the length of the conveyor belt, said frame having means defining an upper curved impact supporting member formed by a pair of side-by-side transversely extending T-shaped supports, said supports extending in generally parallel relation of said support frame transversely of said belt, and a low friction belt-engaging means mounted on said T-shaped supports and extending transversely of said belt.

* * * * *